Dec. 16, 1930.  F. H. WINTER  1,785,569
ELECTRICAL REGULATOR
Filed Dec. 19, 1929
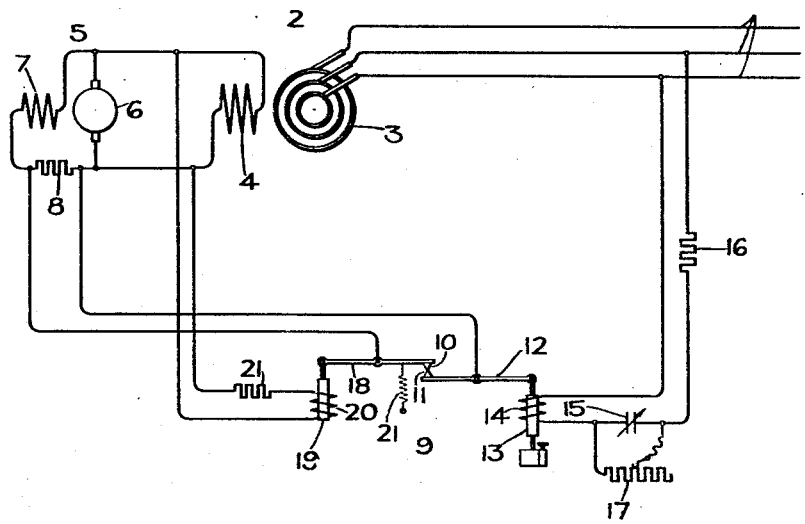
Inventor:
Fred H. Winter,
by Charles E. Tullar
His Attorney.

Patented Dec. 16, 1930

1,785,569

UNITED STATES PATENT OFFICE

FRED H. WINTER, OF SCHENECTADY, NEW YORK, ASSIGNOR TO GENERAL ELECTRIC COMPANY, A CORPORATION OF NEW YORK

ELECTRICAL REGULATOR

Application filed December 19, 1929. Serial No. 415,330.

My invention relates to electrical regulators, and more particularly to regulators of an electrical condition of high frequency circuits.

I have found that electrical regulators, of the type which have a magnetically operated main controlling member, produce an objectionable under-compounding effect when they are associated with high frequency circuits, such as those which often feed induction furnaces. The reason for this is thought to be that as the armature or core moves with respect to the magnet, as a result of the change in the electrical condition which is being regulated, the inductive reactance of the circuit containing the magnet changes so that the proper relation between the magnitude of the regulated condition and the magnitude of the current through the magnet is not preserved, with the result that the movement of the main controlling member is not as great as it should be. Thus, it follows that the tendency to under-compound is present to a greater or less extent in all alternating current regulators of this type, it only being noticeably objectionable, however, at comparatively high frequencies. At very high frequencies additional operating difficulties are also encountered due to the fact that the inductive reactance of the magnet becomes so high that it is impossible to force the necessary operating current through it with the available voltage.

In order to overcome the above mentioned difficulties I propose to insert a condenser, having the proper capacitance, in the circuit of the main control magnet and provide a regulating device for the circuit so that the power factor of the circuit containing the magnet may be made substantially unity with the result that when the core or armature moves the effect will be to change the current but very slightly so that a substantially flat regulation is obtained. Furthermore, as the power factor is unity or thereabouts the resulting impedance of the circuit will be low enough to allow the passage of sufficient current at high frequencies.

It is an object of my invention to provide a new and improved electrical regulator for alternating current circuits.

It is another object of my invention to provide means for preventing the under-compounding of electrical regulators, having magnetically operated main control elements, when associated with high frequency circuits.

My invention will be better understood from the following description taken in connection with the accompanying drawing and its scope will be pointed out in the appended claims.

Referring now to the single figure of the drawing, which is a schematic view of a preferred embodiment of my invention, 1 is a three phase circuit to which is connected a synchronous machine 2, which is preferably a high frequency machine, comprising an armature 3 and a field winding 4. Field winding 4 is energized by an exciter 5 comprising armature 6 connected across the terminals thereof and a shunt field winding 7 in whose circuit is a resistance 8. Connected to said circuit and to said synchronous machine is a regulator 9 for regulating an electrical condition of circuit 1 through the proper control of the field excitation of synchronous machine 2. As shown, regulator 9 is of the conventional Tirrill type and it is connected so as to maintain constant voltage on circuit 1, although as the description of my invention proceeds it will be obvious to those skilled in the art that any regulator employing a magnetically operated main control member for regulating any of the other electrical conditions of circuit 1, such as current, power, power factor, etc., might equally well be employed without departing from my invention in its broader aspects.

Regulator 9 comprises a pair of main control contacts 10 and 11 which are arranged to short circuit the resistance 8 in the circuit of the exciter field winding 7. Contact 11 is supported on a pivotally mounted main control lever 12 to which is attached a core 13 which is acted upon by the main control coil 14. This coil is connected across any two of the conductors of line 1. In the circuit with this coil I place a condenser 15 which may be a fixed condenser if properly chosen with respect to the inductance of coil 14 or variable as shown for adjusting the power factor of the circuit of coil 14 and a current limiting resistance 16, while connected in parallel with condenser 15 is a variable resistance 17 for also adjusting the power factor of the circuit of coil 14. The presence of this variable resistance is not essential to the operation of my invention and it is provided merely to increase the range of power factor adjustment. Contact 10 is supported on a pivotally mounted lever 18 to which is connected a core member 19 which is actuated by the usual anti-hunting coil 20 connected across the terminals of the exciter 5. A suitable current limiting resistance 21 is connected in series with coil 20. The conventional four springs for opposing the pull of the anti-hunting coil are represented by spring 21.

The operation of my device is as follows. Assume that machine 2 is an alternator, although for the purpose of my invention it might equally well be a synchronous motor or condenser, and that this machine and exciter 6 are being driven by suitable sources of power. Under these conditions and with constant load on circuit 1 the current through coil 14 will be constant and main control contact 11 will be stationary. The anti-hunting lever 18 will then be operating in the well known vibratory manner to hold constant excitation on machine 2, through the action of anti-hunting coil 20 and spring 21. Resistance 17, which may be so adjusted as to either short circuit condenser 15 or place a very high resistance in parallel therewith or condenser 15 or both are so adjusted that at the frequency of circuit 1 the power factor of the current in the series circuit including coil 14 and condenser 15 is substantially unity. Therefore, when core 13 drops, due to a decrease in voltage on circuit 1, the effect will be to decrease the current through coil 14 but very slightly more than the decrease which is due solely to the drop in voltage on circuit 1. That is to say, if the circuit containing coil 14 and condenser 15 were a pure resistance the proportion between the current through it and the voltage of the circuit would remain the same for all voltages, but due to the fact that the current through the circuit containing coil 14 and condenser 15 is substantially in phase with its voltage, the effect of the dropping of core 13 will be to decrease the inductive reactance of coil 14, and as this inductive reactance must be equal to the capacitive reactance of the condenser in order to obtain unity power factor the series impedance of the circuit will increase very slightly, thereby causing a very slight decrease in the current through it beyond that which is occasioned by the mere decrease in line voltage. As a result there will be no tendency for core 13 to remain at a higher position than it should when the voltage of line 1 decreases as would be the case with the ordinary regulator which tends to under-compound, especially at the higher frequencies. If the voltage of circuit 1 rises, core 13 will rise, thereby increasing the inductive reactance of the circuit which likewise causes an increase in the impedance of the circuit and a very slight decrease in current below the value that it should have at the new voltage if the impedance did not change.

Viewing the operation from another aspect, when the power factor of the circuit containing coil 14 is substantially unity, its resistance is highest with respect to its reactance so that given changes in its inductive reactance produce proportionately very much smaller changes in its impedance than is the case when its resistance is low with respect to its inductive reactance, which is the ordinary situation when the circuit contains no capacitive reactance. This is because in the first case the given changes in inductive reactance represent changes in a very small component of the impedance of the circuit, while in the second case the same changes in the inductive reactance of the circuit are changes in the large component of the impedance of the circuit. In the ordinary regulator operating magnet, its inductive reactance at relatively high frequencies, for example 1000 cycles a second, is much greater than its resistance.

It will be seen that by properly adjusting the capacitance of condenser 15, or the value of resistance 17, or both, it is possible to vary within wide limits the power factor of the circuit containing magnet 14. From the foregoing it also follows that the more lagging the power factor becomes the greater the tendency of the regulator to under-compound, the more leading the power factor becomes the greater the tendency of the regulator to over-compound, while at unity power factor, with the core in its normal position, the regulation is substantially flat, there being theoretically a very slight tendency to over-compound when the voltage falls and to under-compound when the voltage rises due to the fact that at unity power factor the current in the magnet decreases whichever way the core moves. I prefer to adjust my regulator so that the power factor is very slightly leading, that is to say, so that it is substantially unity but is on the leading side thereof, so that if anything, there is a slight tendency to over-compound, which when the line impedance drop is taken into consideration leads to a flat regulation at the load.

The regulating action of regulator 9 is well known to those skilled in the art and is briefly as follows. Should the voltage of line 1 decrease, core 13 will drop, causing contact 11 to rise, with the result that contacts 10 and 11 remain in engagement a greater portion of the time, thereby decreasing the effective resistance in the field of exciter 5 and thereby raising the voltage of machine 2. As soon as the voltage returns to normal the core 13 ceases to move whereupon the anti-hunting elements maintain a new average current in the field circuit of exciter 5 in the well known manner.

It is to be noted that as the power factor of the circuit containing coil 14 and condenser 15 is very close to unity the effective impedance of the circuit will be very nearly equal to its pure resistance so that no matter what the frequency of circuit 1 is, so long as this condition is maintained, a large enough operating current may always be made to flow through coil 14, depending upon the magnitude of current limiting resistance 16.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In a regulator of an electrical condition of alternating current circuits, in combination, an alternating current circuit, a magnet coil connected to said circuit, and means associated with said coil for causing the circuit containing the latter to operate at substantially unity power factor.

2. In a regulator of an electrical condition of alternating current circuits, in combination, an alternating current circuit, a main control coil connected to said circuit, a condenser in series with said coil, the relative value of the inductance of said coil to the capacitance of said condenser being such that the current in said coil is substantially in phase with the voltage.

3. In an electrical regulator of an electrical condition of alternating current circuits, in combination, a main control coil connected to said circuit, a condenser in series with said coil, said condenser having a greater ohmic reactance than said coil at the frequency of said alternating current circuit, a variable resistance connected in parallel with said condenser, said resistance being so adjusted that the circuit containing said coil and condenser is operating at slightly leading power factor.

4. In a voltage regulator for high frequency circuits, in combination, a high frequency circuit, a main control coil connected to said circuit, and means, including an adjustable element, for making the power factor of the circuit containing said coil slightly leading at any frequency of said high frequency circuit.

5. In combination, a high frequency circuit, a voltage regulator of the vibratory contact type, said regulator including a main control coil connected across said circuit, and means associated with the circuit containing said coil for making the power factor of said last mentioned circuit substantially unity.

6. In a regulating system, in combination, an alternating current circuit, a synchronous machine connected to said circuit, a regulator for regulating an electrical condition of said circuit through control of the excitation of said machine, said regulator including a main contact coil connected to said circuit, an armature for said coil, and means for preventing under-compounding of said regulator as a result of the movement of said armature with respect to said coil upon variations in said regulated condition comprising a condenser in series with said coil, the reactance of said condenser being slightly greater than the reactance of said coil when said armature is in its normal position.

7. In a regulating system, in combination, a high frequency circuit, a high frequency alternator connected thereto, a regulator of the vibratory contact type for regulating an electrical condition of said circuit through control of the field excitation of said alternator, said regulator including a main control coil connected to said circuit, a condenser connected in series with said coil, a variable resistance connected across said condenser, said variable resistance being so adjusted that under normal operating conditions the power factor of the circuit including said coil is substantially unity.

8. In a voltage regulating system, in combination, an alternating current circuit, an alternator connected thereto, a voltage regulator of the vibratory contact type for maintaining constant voltage on said circuit through control of the excitation of said alternator, said regulator including a main control magnet, said magnet including a coil connected across said line and a core armature, a variable condenser connected in series with said coil, a variable resistance connected in parallel with said condenser, said variable elements being so adjusted that the power factor of the circuit containing said coil is slightly leading when the load conditions of said alternating current circuit are normal.

In witness whereof, I have hereunto set my hand this 18th day of December, 1929.

FRED H. WINTER.